United States Patent [19]

Lysson et al.

[11] Patent Number: 5,588,997
[45] Date of Patent: Dec. 31, 1996

[54] DEVICE FOR COATING AN OPTICAL FIBER

[75] Inventors: Hans-Jürgen Lysson, Korschenbroich; Reiner Broden; Hans-Detlef Leppert, both of Mönchengladbach, all of Germany

[73] Assignee: Kabel Rheydt AG, Monchen-Gladbach, Germany

[21] Appl. No.: 341,477

[22] Filed: Nov. 17, 1994

[30] Foreign Application Priority Data

Nov. 18, 1993 [DE] Germany .................. 9317617 U

[51] Int. Cl.⁶ .................................................. B05C 3/02
[52] U.S. Cl. ............................................. 118/405; 118/420
[58] Field of Search ........................ 65/529, 432, 425; 118/420, 405, 419; 425/113, 114; 156/180, 242; 264/172.15, 172.16, 280

[56] References Cited

U.S. PATENT DOCUMENTS

| Re. 28,029 | 6/1974 | Keck et al. ....................... 65/3 |
| 3,700,486 | 10/1972 | Veltri et al. ...................... 117/71 |
| 4,076,510 | 2/1978 | Mracek et al. ................... 65/3 |
| 4,246,299 | 1/1981 | Ohls ................................ 427/54.1 |
| 4,264,649 | 4/1981 | Claypoole et al. .............. 427/163 |
| 4,374,161 | 2/1983 | Geyling et al. .................. 427/160 |
| 4,396,409 | 8/1983 | Bailey et al. .................... 65/3.11 |
| 4,409,263 | 10/1983 | Aloislo, Jr. et al. ............. 427/163 |
| 4,427,717 | 1/1984 | Gauthier .......................... 427/163 |
| 4,439,467 | 3/1984 | Kassahun et al. ............... 427/163 |
| 4,455,159 | 6/1984 | Lamb et al. ..................... 65/3.11 |
| 4,510,884 | 4/1985 | Rosebrooks ..................... 118/405 |
| 4,533,570 | 8/1985 | Iyengar ........................... 427/163 |
| 4,594,088 | 6/1986 | Pack et al. ....................... 65/3.4 |
| 4,608,276 | 8/1986 | Lamb et al. ..................... 427/163 |
| 4,613,521 | 9/1986 | Smith, Jr. ........................ 427/169 |
| 4,644,898 | 2/1987 | Jochem et al. .................. 118/405 |
| 4,688,515 | 8/1987 | Rosebrooks ..................... 118/405 |
| 4,765,271 | 8/1988 | Jochem et al. .................. 118/405 |
| 4,913,715 | 4/1990 | Jochem et al. .................. 65/3.11 |

FOREIGN PATENT DOCUMENTS

| 0462951 | 12/1991 | European Pat. Off. . |
| 3832838 | 3/1990 | Germany . |
| 2105618 | 3/1983 | United Kingdom . |
| 2113574 | 8/1983 | United Kingdom . |
| 2179270 | 3/1987 | United Kingdom . |

OTHER PUBLICATIONS

High–Speed Optical Fiber Drawing by Chids, Kimura and Wagatsuma, ECL, vol. 32, No. 3, 1984, pp. 425–431.

*Primary Examiner*—Brenda A. Lamb
*Attorney, Agent, or Firm*—Ware, Fressola, Van Der Sluys & Adolphson

[57] ABSTRACT

A device for coating an optical fiber, for example a glass fiber drawn from a glass preform, comprises a housing (3) with a lengthwise bore (11), into which a nozzle holder (13) containing a receiving aperture (25) is press-fit. An inlet nozzle (33) and an outlet nozzle (43), through which the optical fiber (1) can pass, are press-fit into the receiving hole (25) of nozzle holder (13) at a distance from each other. A coating space for applying a coating material to the optical fiber (1) is located between the inlet nozzle (33) and the outlet nozzle (43). The press-fitting of the nozzles (33, 43) into the nozzle holder (13), and press-fitting the nozzle holder (13) into the housing, achieves better reproducibility of the nozzle (33, 43) positioning when the device is being assembled.

13 Claims, 3 Drawing Sheets

DEVICE FOR COATING AN OPTICAL FIBER

BACKGROUND OF THE INVENTION

1. Field of the Invention

The present invention relates to optical fibers and, more particularly, to a device for coating optical fibers.

2. Description of the Prior Art

Known devices for coating optical fibers typically comprise a housing that contains a lengthwise bore, and a nozzle holder which contains a receiving aperture located in this lengthwise bore. An inlet nozzle with a first nozzle bore and an outlet nozzle with a second nozzle bore, through which the optical fiber can pass, are arranged at a distance from one another in the receiving aperture of the nozzle holder. A space for applying a coating material to the optical fiber is formed between the inlet nozzle and the outlet nozzle.

Such a device for coating optical fibers is used for example to manufacture a glass fiber for the transmission of optical signals. As is known in the art, an optical fiber may be manufactured by drawing it from a glass preform. During manufacture, the glass fiber is guided over deflection pulleys, which makes it necessary to coat the fiber to protect it against damage. To that end, one or more layers or coatings, for example of a polymer material, are applied to the glass fiber cladding. Typically, these layers have different mechanical properties when several layers are applied.

In known devices for coating an optical fiber, both the inlet nozzle and the outlet nozzle are located in the receiving aperture of the nozzle holder and are affixed to the receiving aperture by sealing rings, which seal the nozzles in the radial direction. The sealing rings are located in a groove formed around the inlet nozzle or the outlet nozzle, for example. The nozzle holder is also affixed in the lengthwise bore of the housing with sealing rings that operate in the radial direction. Seals formed in this manner between two adjacent components require a radial space between the two components, namely the inlet nozzle or the outlet nozzle with respect to the receiving aperture, and the nozzle holder with respect to the lengthwise bore of the housing, which measures about 0.01 mm.

A radial space between components that are sealed against each other in the radial direction has the disadvantage of poor reproducibility during assembly of the device, e.g., after replacing the nozzles, and every new assembly of the components in the device. This poor reproducibility results from the tolerances associated with the required radial space exceeding the permissible production tolerances of the inlet and outlet nozzles, and thereby the coating of the optical fiber, by several magnitudes. Therefore, the uniform application of a coating of a defined thickness is not always guaranteed with such a known device for coating an optical fiber.

SUMMARY OF THE INVENTION

An object of the invention is the provision of a device for coating an optical fiber in a manner to ensure a properly reproducible positioning of an inlet nozzle and an outlet nozzle in a nozzle holder, as well as the properly reproducible positioning of the nozzle holder in a housing, and in this way the uniform application of a coating to an optical fiber.

It has been found that the foregoing objects can be readily attained by press-fitting the nozzle holder into the lengthwise bore of the housing, and press-fitting the inlet nozzle and the outlet nozzle into the receiving aperture of the nozzle holder.

It has been found that the press-fit of the nozzles in the nozzle holder, and the press-fit of the nozzle holder in the housing, eliminates the radial space between the nozzles and the nozzle holder, and between the nozzle holder and the housing, and establishes an effective radial seal between these components. In this manner, after a new composition of the components, e.g., subsequent to replacing the nozzles or reassembling the device after cleaning, good reproducible positioning of the inlet nozzle or the outlet nozzle in the nozzle holder and the nozzle holder and the housing can be achieved. Additionally, a nearly complete parallelism and concentricity of the lengthwise bore in the housing, the receiving aperture of the nozzle holder and the nozzle bores of both nozzles can be achieved. The very accurately aligned bores of the two nozzles produce a uniform coating of the optical fiber, while maintaining a specified coating thickness.

To make it possible to press-fit the nozzle holder into or out of the lengthwise bore of the housing by applying little force, e.g., manually, it is advantageous if the nozzle holder is made of a material with a low coefficient of friction.

For the same reason, it is also advantageous if the housing in the lengthwise bore area is made of a material with a low coefficient of friction, at least in the section where the nozzle holder is pressed in and out.

To simplify the pressing in and out of the inlet and the outlet nozzle into or out of the receiving aperture of the nozzle holder, it is also advantageous if at least the periphery of the inlet and the outlet nozzle is made of a material with a low coefficient of friction.

It is advantageous if the material with a low coefficient of friction is a flexible plastic, preferably polytetra-fluorethylene (PTFE), to simplify pressing the nozzles into and out of the nozzle holder, and the nozzle holder out of the housing. In addition, the use of a flexible plastic produces a good seal in the radial direction between the nozzles and the nozzle holder, and/or between the nozzle holder and the housing, so that the coating material, which may be under high pressure, is prevented from escaping.

It is of special advantage if a stray light screen is press-fit into the receiving aperture of the nozzle holder in the passage direction of the fiber before the inlet nozzle, where the fiber can pass through an opening in the stray light screen. Such a stray light screen essentially precludes an unwanted premature cross-linkage and/or premature hardening of the UV-sensitive coating material used to coat the fiber, particularly in the first nozzle bore of the inlet nozzle, as well as any danger of disturbances during the process.

For a particularly effective reduction of the stray light effect, it is advantageous if the diameter of the stray light screen at its narrowest place is smaller than the diameter of the first nozzle bore of the inlet nozzle at its narrowest place, and larger than the diameter of the second nozzle bore of the outlet nozzle at its narrowest place.

It is advantageous if the device is sealed against the outside by sealing rings that function in the radial direction. This guarantees that the coating material, which may be under high pressure, is prevented from loosening.

The foregoing, and other objects, advantages and features of the present invention will become more apparent in light of the following detailed description of exemplary embodiment thereof, as illustrated in the accompanying drawings.

DETAILED DESCRIPTION OF THE INVENTION

Figure 1:
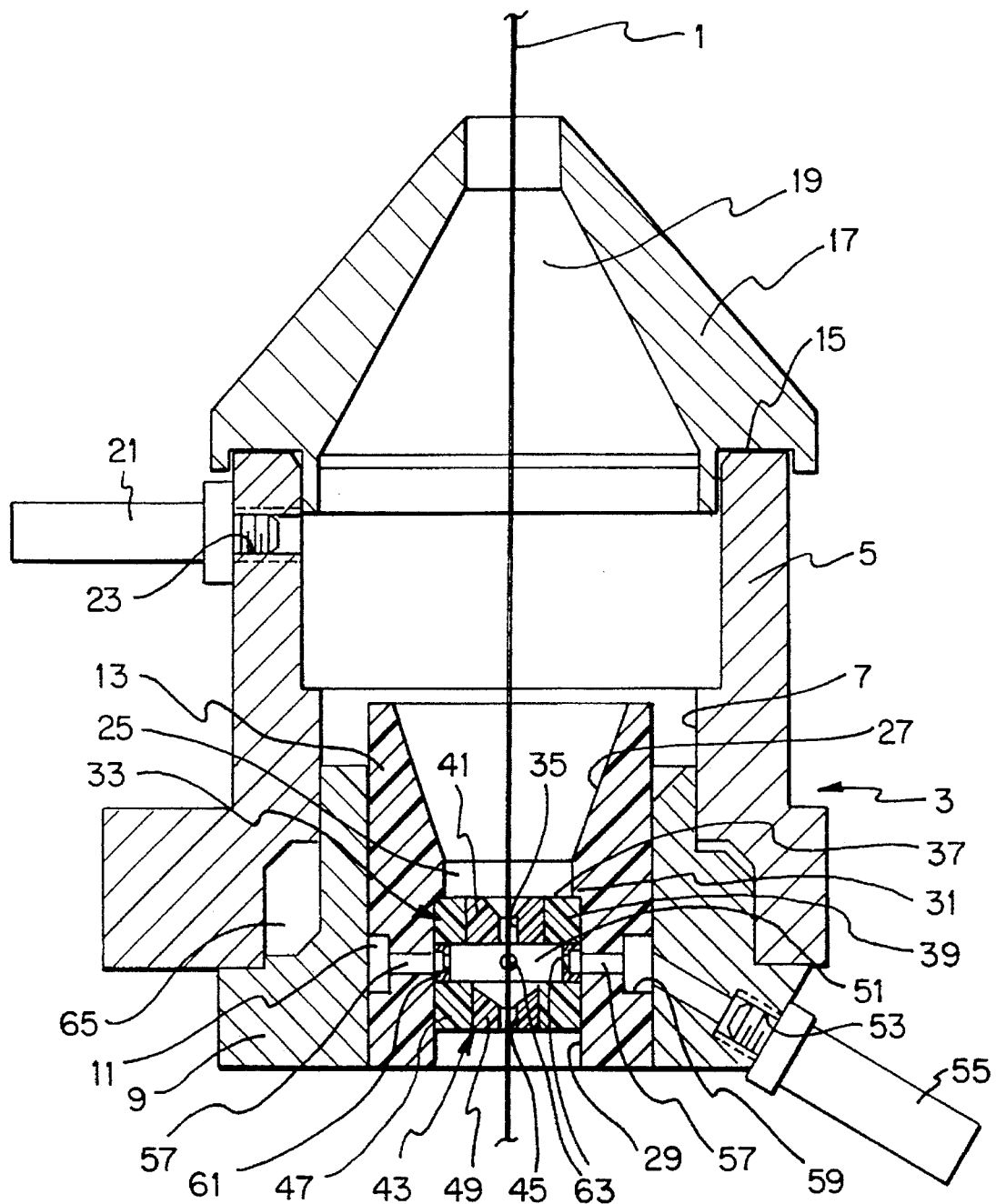
FIG. 1 is a cross-sectional view of a device for coating an optical fiber in accordance with the present invention.

Referring to FIG. 1, a device for coating an optical fiber 1, e.g., an optical glass fiber drawn from a glass preform, comprises a housing 3. The housing 3 comprises a tube-shaped cylinder part 5 with a stepped passage aperture 7. A tube-shaped receiving part 9, which has steps on its periphery, is partially inserted in the axial direction into the open end of the stepped passage aperture 7. The receiving part 9 has a continuous lengthwise bore 11, which is concentric to the passage direction of the optical fiber 1 through the device, into which a tube-shaped nozzle holder 13 is press-fit. A nearly truncated cone-shaped gas cap 17 is placed on the front end 15 of the cylinder part 5, which faces away from the receiving part 9. The truncated cone-shaped gas cap 17, as well as a passage aperture 19 formed therein, widen in the passage direction of the fiber 1 through the device. Thus, the optical fiber 1 to be coated enters the device through the concentric passage aperture 19 of the gas cap 17, and leaves in the coated condition from the end of the housing 3 that faces away from the gas cap 17.

The end of the cylinder part 5 facing the gas cap 17 has a gas feed connector 21 screwed into a threaded bore 23 extending through the wall of the cylinder part 5. Gas with a low kinematic viscosity, for example, can be supplied through the feed connection 21 to the passage hole 7 of the cylinder part 5. The reverse current of the supplied gas strips off any air that is carried along by the optical fiber 1, and possibly particles adhering to the optical fiber.

The nozzle holder 13 and/or the receiving part 9 may be made of a flexible but not rubbery plastic with a low coefficient of friction, such as PTFE (polytetra-fluorethylene), to provide easy manual press-fitting of the nozzle holder 13 into or out of the lengthwise bore 11 of the receiving part 9, as well as a good seal in the radial direction between the nozzle holder 13 and receiving part 9.

A continuous, stepped receiving aperture 25 extends into the nozzle holder 13, e.g. concentric to the passage direction of the fiber 1. The receiving aperture 25 has a funnel section 27 at the end that faces the gas cap 17, which tapers into a truncated cone-shape in the passage direction of the fiber 1, and a parallel section 29 that faces away from the gas cap 17. In the passage direction of the optical fiber 1, between the funnel section 27 and the parallel section 29, the receiving aperture 25 has a retaining step 31 facing in the radial direction, with a narrower open width than the parallel section 29. An inlet nozzle (guide die) 33 with a nozzle bore 35 is press-fit into the parallel section 29 of the receiving aperture 25 of nozzle holder 13 in such a way, that one of its front ends 37 rests against the retaining step 31 of the receiving aperture 25. The inlet nozzle 33 is formed of an outer holding ring 39 made of a flexible plastic with a low coefficient of friction, and a nozzle inset 41 enclosed by the holding ring 39. The plastic material used here must be clearly more flexible than steel, but not rubbery. An outlet nozzle (guide die) 43 with a nozzle bore 45 is press-fit into the parallel section 29 of receiving aperture 25, in the passage direction of the fiber 1, at a distance from the inlet nozzle 33, where the nozzle bore 35 of inlet nozzle 33 and the nozzle bore 45 of the outlet nozzle 43 are axially aligned.

Like the inlet nozzle 33, the outlet nozzle 43 also comprises an outer holding ring 47 made of a flexible plastic with a low coefficient of friction, and a nozzle inset 49 enclosed by the outer holding ring 47. The holding rings 39 and 47 may be made of a flexible plastic with a low coefficient of friction, making it possible to press the nozzles 33 and 43 into or out of the receiving aperture 25 of the nozzle holder 13 in a simple manner. The flexibility of holding rings 39 and 47 provides a good seal in the radial direction between the periphery of the inlet nozzle 33 or the outlet nozzle 43, and the wall of the receiving aperture 25. A suitable material for the holding rings 39 and 47 is, e.g., PTFE (polytetra-fluorethylene).

A coating chamber 51 for applying a coating material to the optical fiber 1 is formed in the axial direction between the inlet nozzle 33 and the outlet nozzle 43. In the coating chamber 51, a lacquer feed nozzle 55, which is used to coat the fiber 1 with a pressurized liquid coating material, e.g., a plastic lacquer that can be cross-linked and/or hardened by UV-radiation, is screwed into a stepped threaded bore 53 of the receiving part 9. The nozzle holder 13 contains four channels 57 extending in the radial direction for the uniform supply of the coating material to the coating chamber 51. A ring groove 59, which is connected to the threaded bore 53, is provided on the periphery of nozzle holder 13 in the area of the channels 57. The receiving aperture 25 contains a ring nozzle 61 with supply apertures 63 that are connected to the channels 57, in the axial direction between the inlet nozzle 33 and the outlet nozzle 43. The liquid coating material reaches the coating chamber 51 through the threaded bore 53, the ring groove 59, the channel 57 and the supply apertures 63 of the ring nozzle 61. The ring nozzle 61 and the inlet nozzle 33 and supported by outlet nozzle 43 in the axial direction against the retaining step 31 of the receiving aperture 25 of the nozzle holder 13.

In this way, good reproducibility of the assembly with nearly complete parallelism and concentricity of the nozzle bore 35 of inlet nozzle 33 and the nozzle bore 45 of outlet nozzle 43, and elimination of the radial space, is provided for the reassembly of the device of the invention, required, e.g., after cleaning or replacing the nozzles 33, 43. This results in a particularly uniform and defined thickness of the optical fiber 1 coating.

A chamber 65 is provided between the receiving part 9 and the cylinder part 5 of the housing 3, which makes it possible to temper the coating material with a liquid medium, thereby maintaining a specified temperature level of the coating material in the coating chamber 51.

Figure 2:
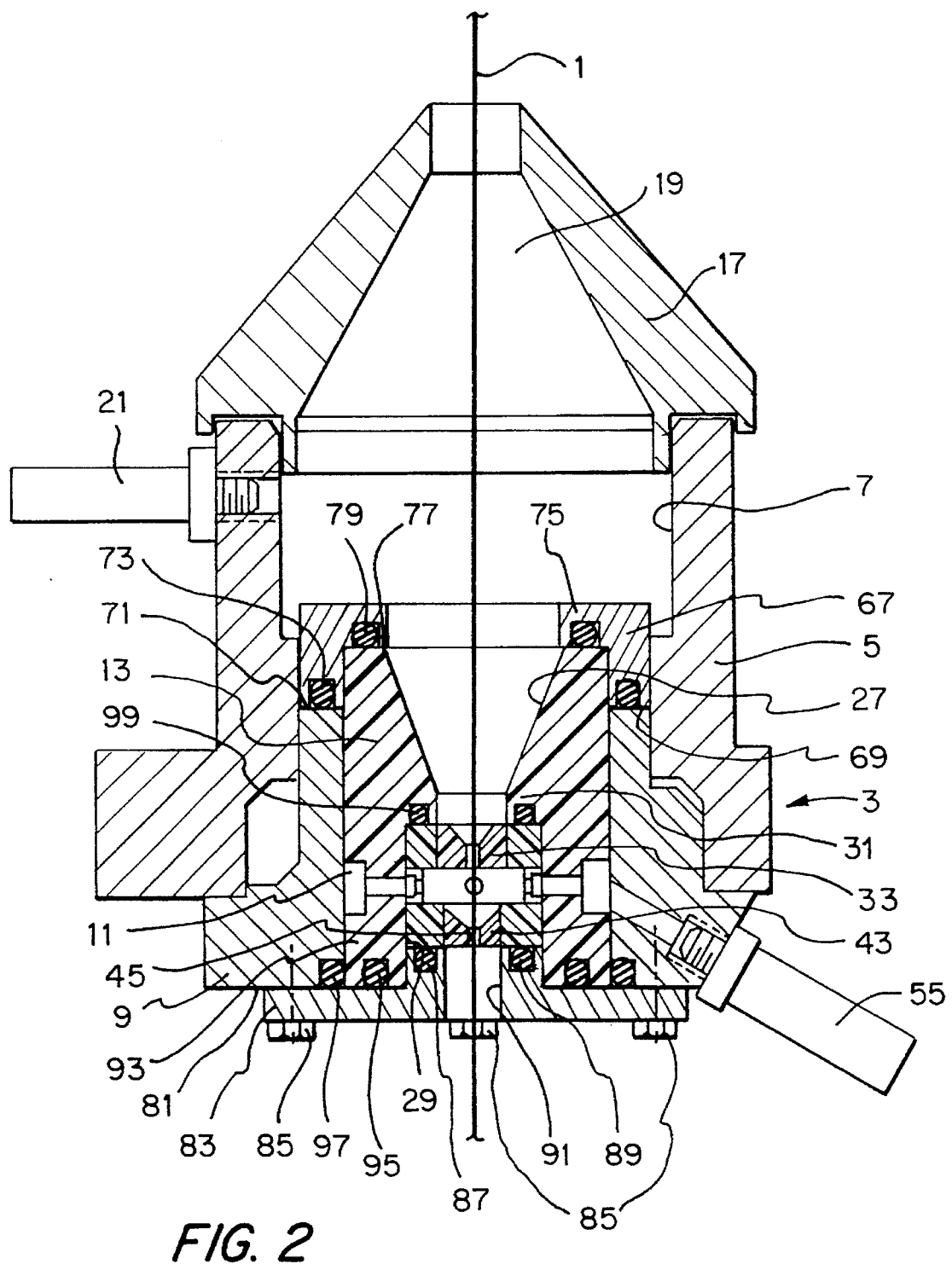
FIG. 2 is a cross-sectional view of an alternative embodiment of a device for coating an optical fiber.

In the event of an insufficient seal between the press-fitting of nozzles 33 and 43 with the nozzle holder 13, and between nozzle holder 13 with the receiving part 9, it is possible to seal the device of the invention against the outside by providing sealing rings that act in the axial direction, to prevent the potentially pressurized coating material from escaping. FIG. 2 illustrates a second embodiment of a device according to the invention, with sealing rings that act in the axial direction. This second embodiment essentially corresponds to the first embodiment illustrated in FIG. 1.

Referring to FIG. 2, a ring-shaped spacer 67 is located in the radial direction between the periphery of the nozzle holder 13 and the wall of the passage aperture 7 of cylinder part 5, with its lower front end 69 facing away from the gas cap 17, at a small distance from the front end 71 of receiving part 9, which faces the gas cap 17. A sealing ring 73 is located in this area, e.g., in a ring groove of the spacer, between the spacer 67 and the receiving part 9. Facing the gas cap 17, the spacer 67 has a retaining section 75 pointing radially inward, against which rests the front end 77 on the inlet side of nozzle holder 13. However, nozzle holder 13 and retaining section 75 can oppose each other at a small distance. A sealing ring 79 is located in an annular groove of retaining section 75, in the axial direction between the retaining section of spacer 67 and the front end 77 of nozzle holder 13.

A housing cover 83 is attached to the receiving part 9 by four attachment screws 85, at the lower front end 81 of receiving part 9, facing away from spacer 67. The housing cover 83 contains a passage bore 91, which extends through the housing cover and is concentric with the nozzle bore 45 of the outlet nozzle 43. The housing cover 83 contains a cylindrical centering section 87 that is concentric with the passing fiber 1, whereby the housing cover 83 protrudes into the parallel section 29 of receiving aperture 25 of nozzle holder 13, and which extends in the axial direction close to the outlet nozzle 43, or rests against the outlet nozzle. A sealing ring 89 is located in a ring groove of the centering section 87 in the axial direction between the outlet nozzle 43 and the centering section 87 of housing cover 83.

In addition, a sealing ring 95 is located in an annular groove of the nozzle holder 13, in the axial direction between the end 93 of the nozzle holder 13 that faces away from front end 77 and the housing cover 83. A sealing ring 97 is also located in an annular groove of the receiving part 9, between the receiving part 9 and the housing cover 83. Additionally, in the axial direction facing away from the housing cover 83, between the inlet nozzle 33 and the retaining step 33 of receiving aperture 25 of the nozzle holder 13, which points inward in the radial direction, a sealing ring 99 is provided in an annular groove of the retaining step.

It is of course not necessary to locate such axially functioning sealing rings in all of the illustrated and described areas. In practice, tests may be performed in each individual case to determine which areas of the device require sealing rings.

Figure 3:
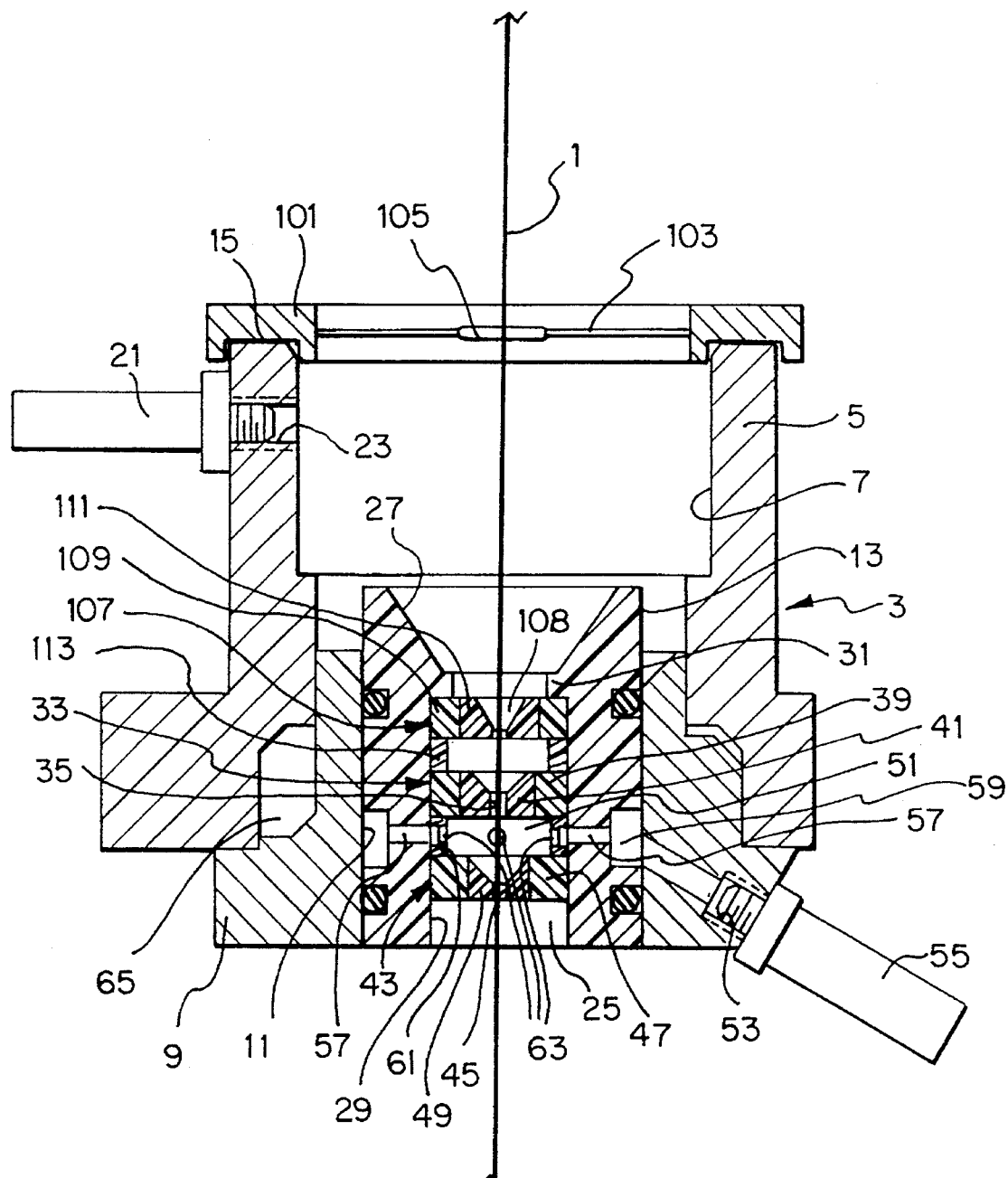
FIG. 3 is a cross-sectional view of a second alternative embodiment of a device for coating an optical fiber.

FIG. 3 illustrates a third embodiment, containing a ring-shaped carrier 101 with an iris aperture 103 that closes off the passage hole 7 of cylinder part 5, located at the front end 15 of the cylinder part 5 which faces away from the receiving part 9. The optical fiber 1 to be coated enters the device through an opening 105 of the iris aperture 103, which is concentric with the receiving aperture 25 of nozzle holder 13. The coated optical fiber exits the device from the end of the housing 3 that faces away from the iris aperture 103.

In the direction in which the optical fiber 1 passes through the device of the invention, a stray light screen 107 is located at a comparatively small distance from inlet nozzle 33, e.g. 2 to 7 mm, for example in the parallel section 29 of the stepped receiving aperture 25 of nozzle holder 13.

The optical fiber 1 to be coated runs through the opening 108, which tapers in the passage direction of the optical fiber 1, and is concentric with it. The stray light screen 107 is formed of an outer retaining ring 109 made of a flexible plastic with a low coefficient of friction, such as PTFE, and an aperture holder 111 enclosed by the retaining ring 109, and is press-fit into the receiving aperture 25. The front end of the stray light screen 107, which faces away from the inlet nozzle 33, is located on the retaining step 31 of receiving hole 25.

The diameter of the opening 108 of stray light screen 107, which is aligned with the first nozzle bore 35 of inlet nozzle 33, is smaller at its narrowest cross-section than the diameter of the first nozzle bore 35 at its narrowest cross-section, but larger than the diameter of the second nozzle bore 45 of outlet nozzle 43 at its narrowest cross-section. In this way e.g., the diameter of the first nozzle bore 35 of inlet nozzle 33 can measure 500 μm at its narrowest cross-section, the diameter of the opening 108 of stray light screen 107 can measure 400 μm at its narrowest cross-section, and the diameter of the second nozzle bore 45 of outlet nozzle 43 can measure 300 μm at its narrowest cross-section. This staggering of the diameters of nozzle bores 35 and 45 and opening 108 ensures that no stray light reaches the outer rim of the first nozzle bore 35 of inlet nozzle 33, and any contact and possible damage of the optical fiber 1, while passing through the opening 108, is reliably prevented. Namely in the first nozzle bore 33, the flow velocity of the UV-sensitive liquid material, which serves to coat the fiber 1 in the first nozzle hole 33, is nearly zero, and therefore the danger of an unwanted premature cross-linkage and/or premature hardening of the coating material is particularly high.

A spacer ring 113 is located in the passage direction of fiber 1 between the inlet nozzle 33 and the stray light screen 107, which prevents the stray light screen from becoming contaminated during possible processing problems. In this way, the stray light screen 107, the inlet nozzle 33 on the spacer ring 113, and the outlet nozzle 43 on the ring nozzle 61, are supported by the retaining step 31 of nozzle holder 13, against the axial direction of the passage of fiber 1.

Although the invention has been described with respect to exemplary embodiments thereof, the foregoing and various other changes, omissions and additions may be made therein and thereto without departing from the spirit and scope of the invention.

What is claimed is:

1. A device for coating an optical fiber, comprising a housing having a lengthwise bore;

a nozzle holder, which is located in said lengthwise bore, said nozzle holder having a receiving aperture formed therein;

an inlet nozzle, having a first nozzle bore, received in one end of said receiving aperture;

an outlet nozzle, having a second nozzle bore, received in an opposite end of said receiving aperture;

said inlet nozzle and said outlet nozzle being arranged at a distance from one another with said first nozzle bore and said second nozzle bore being axially aligned such that an optical fiber can pass therethrough in a passage direction;

wherein a coating material is applied to the optical fiber while passing between said inlet nozzle and said outlet nozzle;

wherein the nozzle holder is press-fit into said lengthwise bore of said housing;

wherein said inlet nozzle and said outlet nozzle are press-fit into said receiving aperture of said nozzle holder; and wherein said nozzle holder is made of a flexible plastic material having a low coefficient of friction, said material having a low coefficient of friction simplifying the press-fit of said inlet and outlet nozzles into said receiving aperture of said nozzle holder, and said material having a low coefficient of friction providing a seal in a radial direction between said inlet and outlet nozzles and said nozzle holder to thereby prevent the passage of said coating material therebetween.

2. A device as claimed in claim 1, wherein in the area of said lengthwise bore which comes in contact with said nozzle holder, said housing is made of said material having a low coefficient of friction, said material having a low coefficient of friction simplifying the press-fit of said nozzle holder into said lengthwise bore of said housing, and said material having a low coefficient of friction providing a seal in a radial direction between said nozzle holder and said housing to thereby prevent the passage of said coating material therebetween.

3. A device as claimed in claim 2, wherein said inlet nozzle and said outlet nozzle are made of said material having a low coefficient of friction for simplifying the press-fit of said inlet and outlet nozzles into said receiving aperture of said nozzle holder, and for providing a seal in a radial direction between said inlet and outlet nozzles and said nozzle holder to thereby prevent the passage of said coating material therebetween.

4. A device as claimed in claim 3, wherein said material having a low coefficient of friction is polytetra-fluorethylene.

5. A device as claimed in claim 2, wherein the surfaces of said inlet nozzle and said outlet nozzle which come in contact with the surface of said nozzle holder in said receiving aperture are made of said material having a low coefficient of friction for simplifying the press-fit of said inlet and outlet nozzles into said receiving aperture of said nozzle holder, and for providing a seal in a radial direction between said inlet and outlet nozzles and said nozzle holder to thereby prevent the passage of said coating material therebetween.

6. A device as claimed in claim 5, wherein said material having a low coefficient of friction is polytetra-fluorethylene.

7. A device as claimed in claim 1, further comprising a stray light screen which is press-fit into a receiving aperture of said nozzle holder, said stray light screen being positioned in said passage direction of the optical fiber before said inlet nozzle, so that the optical fiber can pass through an opening in said stray light screen, and wherein said stray light screen precludes light from reaching said coating material in the first nozzle bore of said inlet nozzle.

8. A device as claimed in claim 7, wherein the diameter of the opening in said of stray light screen is smaller at its narrowest cross-section than the diameter of said first nozzle bore of said inlet nozzle at its narrowest cross-section, and is larger than the diameter of the second nozzle bore of said outlet nozzle at its narrowest cross-section.

9. A device as claimed in claim 1, wherein said inlet nozzle and said outlet nozzle are made of said material having a low coefficient of friction for simplifying the press-fit of said inlet and outlet nozzles into said receiving aperture of said nozzle holder, and for providing a seal in a radial direction between said inlet and outlet nozzles and said nozzle holder to thereby prevent the passage of said coating material therebetween.

10. A device as claimed in claim 9, wherein said material having a low coefficient of friction is polytetra-fluorethylene.

11. A device as claimed in claim 1, wherein the surface of said inlet nozzle and said outlet nozzle which come in contact with the surface of said nozzle holder in said receiving aperture are made of said material having a low coefficient of friction for simplifying the press-fit of said inlet and outlet nozzles into said receiving aperture of said nozzle holder, and for providing a seal in a radial direction between said inlet and outlet nozzles and said nozzle holder to thereby prevent the passage of said coating material therebetween.

12. A device as claimed in claim 11, wherein said material having a low coefficient of friction is polytetra-fluorethylene.

13. A device as claimed in claim 1, further comprising sealing means for sealing the device in the axial direction.

* * * * *